(12) United States Patent
Whitehouse

(10) Patent No.: US 9,346,948 B2
(45) Date of Patent: May 24, 2016

(54) TOUGHENED POLYHYDROXYALKANOATE COMPOSITIONS

(75) Inventor: Robert S. Whitehouse, Lexington, MA (US)

(73) Assignee: Metabolix, Inc., Cambridge, MA (US)

( * ) Notice: Subject to any disclaimer, the term of this patent is extended or adjusted under 35 U.S.C. 154(b) by 776 days.

(21) Appl. No.: 13/391,894

(22) PCT Filed: Aug. 27, 2010

(86) PCT No.: PCT/US2010/047014
§ 371 (c)(1),
(2), (4) Date: Feb. 23, 2012

(87) PCT Pub. No.: WO2011/031558
PCT Pub. Date: Mar. 17, 2011

(65) Prior Publication Data
US 2012/0149844 A1 Jun. 14, 2012

(51) Int. Cl.
| | | |
|---|---|---|
| C08L 29/04 | (2006.01) |
| C08L 67/04 | (2006.01) |
| C08L 31/04 | (2006.01) |
| C08J 3/00 | (2006.01) |
| C08K 3/24 | (2006.01) |
| C08K 5/34 | (2006.01) |
| C08K 5/3492 | (2006.01) |
| C08L 33/04 | (2006.01) |

(52) U.S. Cl.
CPC .............. C08L 31/04 (2013.01); C08J 3/005 (2013.01); C08L 67/04 (2013.01); C08J 2367/04 (2013.01); C08K 3/24 (2013.01); C08K 5/34 (2013.01); C08K 5/34924 (2013.01); C08L 29/04 (2013.01); C08L 33/04 (2013.01); C08L 2205/02 (2013.01)

(58) Field of Classification Search
CPC ............ C08J 3/005; C08J 29/04; C08J 31/04; C08J 67/04
See application file for complete search history.

(56) References Cited

U.S. PATENT DOCUMENTS

| | | | |
|---|---|---|---|
| 5,866,634 A | 2/1999 | Tokushige et al. | |
| 6,592,892 B1 | 7/2003 | Williams | |
| 7,241,838 B2 | 7/2007 | Shelby et al. | |
| 7,371,799 B2 | 5/2008 | Mather et al. | |
| 7,642,301 B2 | 1/2010 | Uradnisheck | |
| 7,867,422 B2 | 1/2011 | Nelson et al. | |
| 7,884,143 B2 | 2/2011 | Fournier et al. | |
| 7,973,101 B2 | 7/2011 | Aoyama et al. | |
| 8,202,947 B2 | 6/2012 | Pfaadt et al. | |
| 2002/0028857 A1 | 3/2002 | Holy | |
| 2006/0147412 A1 | 7/2006 | Hossainy et al. | |
| 2007/0182041 A1 | 8/2007 | Rizk et al. | |
| 2007/0213466 A1 | 9/2007 | Uradnisheck | |
| 2008/0071008 A1 | 3/2008 | Smillie et al. | |
| 2008/0071018 A1* | 3/2008 | Smillie et al. | 524/437 |
| 2009/0076191 A1 | 3/2009 | Aoyama et al. | |
| 2009/0162683 A1* | 6/2009 | Douard | 428/480 |

FOREIGN PATENT DOCUMENTS

| | | |
|---|---|---|
| EP | 1881036 A1 | 1/2008 |
| WO | WO 2008/036334 A2 | 3/2008 |
| WO | WO 2010/043648 | 4/2010 |
| WO | WO 2010/133560 A1 | 11/2010 |
| WO | WO 2011/031558 A2 | 3/2011 |

OTHER PUBLICATIONS

International Search Report for International Application No. PCT/US2010/047014, date of mailing: May 13, 2011.
International Preliminary Report on Patentability and Written Opinion of International Searching Authority on International Application No. PCT/US2010/047014; date of mailing Mar. 8, 2012.
Supplementary European Search Report on International Application No. 10815895.7; date of mailing Feb. 21, 2013.

* cited by examiner

*Primary Examiner* — Ling Choi
*Assistant Examiner* — Marie Reddick
(74) *Attorney, Agent, or Firm* — Foley Hoag LLP

(57) ABSTRACT

Toughened polyhydroxyalkanoate resin compositions are disclosed, comprising thermoplastic polyhydroxyalkanoate compositions and a toughener comprising a vinyl acetate homopolymer or copolymer and optionally polyvinyl alcohol.

16 Claims, No Drawings

TOUGHENED POLYHYDROXYALKANOATE COMPOSITIONS

RELATED APPLICATION

This application is the U.S. National Stage of International Application No. PCT/US2010/047014, filed on Aug. 27, 2010, which designates the U.S. published in English, and claims the benefit of U.S. Provisional Application No. 61/237,368, filed on Aug. 27, 2009. The entire teachings of which are incorporated herein by reference.

BACKGROUND OF THE INVENTION

Biodegradable plastics are of increasing industrial interest as replacements or supplements for non-biodegradable plastics in a wide range of applications and in particular for packaging applications. One class of biodegradable polymers is the polyhydroxyalkanoates (PHAs). These polymers are synthesized by soil microbes for use as intracellular storage material. Articles made from the polymers are generally recognized by soil microbes as a food source. There has therefore been a great deal of interest in the commercial development of these polymers, particularly for disposable consumer items. To date, however, PHAs have seen limited commercial availability, with only the copolymer poly(3-hydroxybutyrate-co-3-hydroxyvalerate) (PHBV) being available in appreciable quantities.

Although various PHAs are capable of being processed on conventional processing equipment, many problems have been found with the polymers. These include lack of processability in some situations, which can limit the commercial applications available for use of the polymer; molecular weight may be difficult to maintain. In addition, the crystallization kinetics of the polymer are poorly understood, and long cycle times are often required during processing of these polymers, further limiting their commercial acceptance.

PHA compositions containing high levels of 3-hydroxybutyrate monomer can have physical limitations such as brittleness and thermal stability issues at melt processing temperatures (e.g., those temperatures used in injection molding, sheet extrusion and blown film conversion), and the resultant products may not have an acceptable degree of toughness for many applications. Thus, a need exists for toughened PHA compositions.

SUMMARY OF THE INVENTION

Disclosed herein are toughened polyhydroxyalkanoate resin compositions, comprising (A) polyhydroxyalkanoate homopolymers, copolymers and blends thereof, and (B) a toughener comprising a vinyl acetate homopolymer or copolymer and a monomer as disclosed herein, and optionally polyvinyl alcohol.

Specifically, the toughener comprises a vinyl acetate homopolymer or vinyl acetate copolymer made from vinyl acetate and at least one monomer selected from:

(a) ethylene;

(b) (meth)acrylic esters (for example, one or more esters of unbranched or branched alcohols having from 1 to 15 carbon atoms, e.g., methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate);

(c) vinyl esters having from 1 to 12 carbon atoms in the carboxylic acid radical (e.g., vinyl propionate, vinyl laurate, vinyl esters of alpha-branched carboxylic acids having from 9 to 13 carbon atoms);

(d) carboxyl-group-containing monomer selected from the group of acrylic acid, methacrylic acid, crotonic acid, itaconic acid, fumaric acid, maleic acid, and salts thereof;

(e) glycidyl methacrylate, hydroxyethyl methacrylate, acrylamide and vinyl pyrollidone; and (f) vinyl alcohol.

The toughener can optionally comprise polyvinyl alcohol having from about 60% to about 99.8% degree of hydrolysis.

A composition is provided that includes: (a) from 50 percent by weight to 99.8 percent by weight biologically-produced polyhydroxyalkanoate polymer, and (b) from 0.2 percent by weight to 50 percent by weight of a toughening component (a toughener). The toughening component includes a vinyl acetate polymer comprising from 60 percent to 100 percent by weight vinyl acetate monomer, with the remainder being made up from at least one of the following: (i) up to about 14 weight percent ethylene; (ii) (meth)acrylic esters; (iii) vinyl esters having from 1 to 12 carbon atoms in the carboxylic acid radical; (iv) a carboxyl-group-containing monomer selected from the group consisting of acrylic acid, methacrylic acid, crotonic acid, itaconic acid, fumaric acid, maleic acid, and salts thereof; and (v) glycidyl methacrylate, hydroxyethyl methacrylate, acrylamide or vinyl pyrollidone; and (vi) vinyl alcohol.

Also provided herein is a method of forming a biodegradable polymeric composition. The method includes combining: a biologically-produced polyhydroxyalkanoate polymer, a toughening component, and a nucleating agent, under conditions sufficient to form a largely homogeneous composition; thereby forming a biodegradable polymeric composition. The toughening component includes a vinyl acetate polymer that includes from 60 percent to 100 percent by weight vinyl acetate monomer, with the remainder being made up from at least one of the following: (i) up to about 14 weight percent ethylene, (ii) (meth)acrylic esters, (iii) vinyl esters having from 1 to 12 carbon atoms in the carboxylic acid radical, (iv) a carboxyl-group-containing monomer selected from the group consisting of acrylic acid, methacrylic acid, crotonic acid, itaconic acid, fumaric acid, maleic acid, and salts thereof, and (v) glycidyl methacrylate, hydroxyethyl methacrylate, acrylamide and vinyl pyrollidone and (vi) vinyl alcohol.

In certain embodiments, the polyhydroxyalkanoate polymer component is in the form of a fine particle size powder and the polyvinyl acetate component is in the form of an emulsion, the components are combined in an aqueous process prior to the water being thermally removed. Additionally, provided herein is a method for forming a polymer resin pellet, where the method includes combining: a biologically-produced polyhydroxyalkanoate polymer, a toughening component, a branching agent and a nucleating agent, where the composition is melted and formed under suitable conditions to form a polymer resin pellet. The toughening component includes a vinyl acetate polymer that includes from 60 percent to 100 percent by weight vinyl acetate monomer, with the remainder being made up from at least one of the following: (i) up to about 14 weight percent ethylene, (ii) (meth)acrylic esters, (iii) vinyl esters having from 1 to 12 carbon atoms in the carboxylic acid radical, (iv) a carboxyl-group-containing monomer selected from the group consisting of acrylic acid, methacrylic acid, crotonic acid, itaconic acid, fumaric acid, maleic acid, and salts thereof, and (v) glycidyl methacrylate, hydroxyethyl methacrylate, acrylamide and vinyl pyrollidone and (vi) vinyl alcohol.

Also provided herein are articles made from any of the compositions of the invention. The article is a film, sheet (including multilayer sheets), molding, fiber, filament, rod, tube, bottle, pellet or foam. The article is formed by molding, extruding, or blowing of the composition.

Also provided is a process of forming an article from the compositions as described herein, and the articles made from the process.

In any of the compositions, methods, processes or articles described herein, the (meth)acrylic esters are esters of unbranched or branched alcohols having from 1 to 15 carbon atoms, e.g., methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate). The vinyl esters are those having from 1 to 12 carbon atoms in the carboxylic acid radical (e.g., vinyl propionate, vinyl laurate, vinyl esters of alpha-branched carboxylic acids having from 9 to 13 carbon atoms).

In certain embodiments, the vinyl acetate polymer is a vinyl acetate homopolymer. The vinyl acetate copolymer can include a polyvinyl acetate copolymer having from about 99 to 84 percent by weight vinyl acetate and from about 1 to 16 percent by weight percent ethylene and acrylate co monomers. In other embodiments, the polyvinyl acetate polymer is produced by emulsion polymerization.

The toughener can further include up to about 15 percent by weight of a polyvinyl alcohol having from about 60 to 99.8 percent by weight degree of hydrolysis. The polyvinyl alcohol can include from 1 to 99 percent by weight of a polyvinyl acetate homopolymer and from 99 to 1 percent by weight of a vinyl acetate copolymer or copolymer blend. The polyvinyl alcohol can have a molecular weight from about 10,000 Daltons to about 1,000,000 Daltons. The polyvinyl alcohol component can be cold water soluble or hot water soluble.

In any of the compositions, methods, processes or articles described herein, the polyhydroxyalkanoate polymer component can be in the form of a fine particle size powder, and the polyvinyl acetate component can be in the form of an emulsion, the components being combined in an aqueous process prior to the water being thermally removed.

In any of the compositions, methods, processes or articles described herein, from about 5 to about 95 percent by weight of the composition is a biologically-produced polyhydroxyalkanoate polymer. In certain embodiment, the biologically-produced polyhydroxyalkanoate polymer is branched.

In certain embodiments, the biologically-produced polyhydroxyalkanoate polymer is a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate). The biologically-produced polyhydroxyalkanoate polymer can be a poly(3-hydroxybutyrate) homopolymer, a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content. The biologically-produced polyhydroxyalkanoate can be a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate). The biologically-produced polyhydroxyalkanoate can be a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content.

In other embodiments, the biologically-produced polyhydroxyalkanoate is a) a poly(3-hydroxybutyrate) homopolymer blended with b) a poly(3-hydroxybutyrate-co-4-hydroxybutyrate) and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) can be 5% to 95% of the combined weight of polymer a) and polymer b); a) a poly(3-hydroxybutyrate) homopolymer blended to with b) a poly(3-hydroxybutyrate-co-3-hydroxyhexanoate) and the weight of polymer a) can be 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) can be 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) can be 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) can be 5% to 95% of the combined weight of polymer a) and polymer b).

In yet other embodiments, the weight of polymer a) is 20% to 60% of the combined weight of polymer a) and polymer b) and the weight of polymer b) is 40% to 80% of the combined weight of polymer a) and polymer b). For example, the weight of polymer a) is 25%-55%, 30-60%, 35-55% or 40-55% of the combined weight of polymer a) or 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% of the combined weight of polymer a). The biologically-produced polyhydroxyalkanoate can be a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b)

a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content.

In other embodiment, the biologically-produced polyhydroxyalkanoate is a) a poly(3-hydroxybutyrate) homopolymer blended with b) a poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) can be 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) can be 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) can be 5% to 95% of the combined weight of polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) can be 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) can be 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) can be 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) can be 5% to 95% of the combined weight of polymer a) and polymer b).

In still other embodiments, the weight of polymer a) is 20% to 60% of the combined weight of polymer a) and polymer b) and the weight of polymer b is 40% to 80% of the combined weight of polymer a) and polymer b).

In other embodiment, the biologically-produced polyhydroxyalkanoate is further blended with polymer c) a poly(3-hydroxybutyrate-co-4-hydroxybutyrate) with a 20% to 50% 4-hydroxybutyrate content. The biologically-produced polyhydroxyalkanoate can be further blended with c) a poly(3-hydroxybutyrate-co-5-hydroxyvalerate) with a 20% to 50% 5-hydroxyvalerate content. The biologically-produced polyhydroxyalkanoate is further blended with c) a poly(3-hydroxybutyrate-co-3-hydroxyhexanoate) with a 5% to 50% 3-hydroxyhexanoate content. In other embodiments, the weight of polymer c) is 5% to 95% of the combined polymer weight of polymer a), polymer b) and polymer c). The weight of polymer c is 5% to 40% of the combined polymer weight of polymer a), polymer b) and polymer c).

In certain embodiments, a nucleating agent is included in the compositions, methods, processes or articles described herein. The nucleating agent is selected from cyanuric acid, carbon black, mica, talc, silica, boron nitride, clay, calcium carbonate, synthesized silicic acid or a salt thereof, a metal salt of organophosphates. The nucleating agent can include aluminum hydroxy diphosphate or a compound comprising a nitrogen-containing heteroaromatic core. The nitrogen-containing heteroaromatic core can be pyridine, pyrimidine, pyrazine, pyridazine, triazine, or imidazole. The nucleating agent can have a chemical formula selected from the group consisting of:

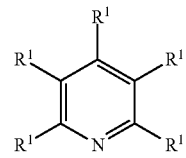

Formula 1

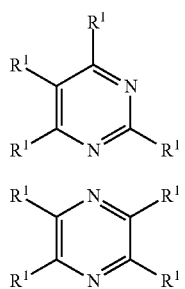

Formula 2

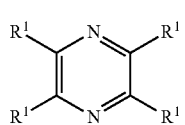

Formula 3

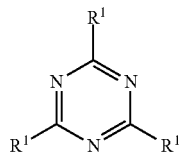

Formula 4

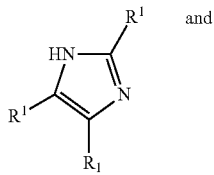

Formula 5

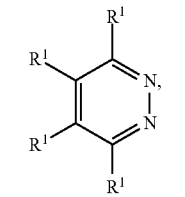

and

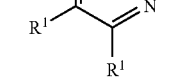

Formula 6 and combinations thereof, wherein each $R^1$ is independently H, $NR^2R^2$, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl. The nucleating agent is cyanuric acid.

In any of the embodiments disclosed, the polymer is a polyhydroxyalkanoate. In particular embodiments the polymer is a branched polyhydroxyalkanoate polymer.

Other features and advantages of the invention will be apparent from the following detailed description, and from the claims.

DETAILED DESCRIPTION OF THE INVENTION

The present invention describes toughened thermoplastic compositions comprising a polyhydroxyalkanoates component comprising one or more polyhydroxyalkanoate homopolymers, polyhydroxyalkanoate copolymers or blends thereof and an toughening component (e.g., an impact toughener) comprising a vinyl acetate homopolymer, vinyl acetate copolymer or blends thereof and optionally a polyvinyl alcohol component.

For instance, disclosed herein are toughened polyhydroxyalkanoate resin compositions, comprising (A) polyhydroxyalkanoate homopolymers, copolymers and blends thereof, and (B) a toughening component (a toughener) comprising a vinyl acetate homopolymer or copolymer and at least one of the following monomers: ethylene, (meth)acrylic esters (esters of unbranched or branched alcohols having from 1 to 15 carbon atoms, e.g., methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate), vinyl esters having from 1 to 12 carbon atoms in the carboxylic acid radical (e.g., vinyl propionate, vinyl laurate, vinyl esters of alpha-branched carboxylic acids having from 9 to 13 carbon atoms), carboxyl-group-containing monomers (e.g., acrylic acid, methacrylic acid, crotonic acid, itaconic acid, fumaric acid, maleic acid, and salts thereof), glycidyl methacrylate, hydroxyethyl methacrylate, acrylamide and vinyl pyrollidone and (vi) vinyl alcohol.

The toughener can optionally comprise polyvinyl alcohol having from about 60% to about 99.8% degree of hydrolysis.

Methods for making such compositions are also provided herein.

For instance, in certain embodiments, the toughened polyhydroxyalkanoate composition includes (i) about 50 to about 99.8 weight percent polyhydroxyalkanoates homopolymer, copolymer or blends thereof and (ii) about 0.2 to about 50 weight percent of an impact modifier comprising an vinyl acetate polymer comprising from about 60 weight percent to about 100 weight percent vinyl acetate monomer and the remainder from acrylate, methacrylate vinyl acids and vinyl esters having from 2 to about 15 carbon atoms in the side chain. The toughened polyhydroxyalkanoate composition can also include about 0 to 15 weight percent polyvinyl alcohol having from about 60 weight percent to about 99.8% degree of hydrolysis.

In another aspect of the invention, the toughened polyhydroxyalkanoate composition includes about 55 to about 95 weight percent polyhydroxyalkanoates homopolymer, copolymer or blends thereof, about 60 to about 90 weight percent polyhydroxyalkanoates homopolymer, copolymer or blends thereof, about 70 to about 99 weight percent polyhydroxyalkanoates homopolymer, copolymer or blends thereof, or about 75 to about 85 weight percent polyhydroxyalkanoates homopolymer, copolymer or blends thereof.

In certain embodiments, the composition is made by melt mixing the individual components to produce a homogeneous mixture. The mixture can is then used for conversion into fabricated parts through injection molding, sheet and profile extrusion, fiber extrusion, cast film extrusion, blown film extrusion, thermoforming, vacuum forming, blow molding, and rotomolding operations. For film applications the composition of the invention may be the complete film or one or more layers in a multilayer coextruder composite structure. Alternatively, the toughened compositions may form different layers within a coextruded laminate, where each layer has a slightly different composition.

In certain aspects, the laminate can be 1-15 layers, for example 2 layers, 3 layers, 4 layers or 5 layers, 6 layers, 7 layers, 8 layers, 10 layers, 11 layers, 12 layers, 13 layers, 14 layers or 15 layers. The overall size of the laminate is about 10 microns to about 100 microns, for example 10-50 microns, 20-60 microns, 25-75 microns. Each individual layer can be 1 to 2 microns, 1-5 micron, 2-4 microns, 2-5 microns. For each laminate, at least one layer is a composition of the invention. In certain embodiments, the compositions of the invention comprise more than one layer.

Alternatively, the toughened polyhydroxyalkanoate compositions are formed by combining the powdered or finely ground polyhydroxyalkanoate component in the vinyl acetate component. The vinyl acetate polymer system is present as an emulsion or dispersion in water or solvent. The resultant emulsion or dispersion is then cast into a film or sheet, dried to remove the water or solvent and then heat fused to melt homogenize the individual components.

In other embodiments, the toughened polyhydroxyalkanoate compositions further include additives. For example in certain embodiments one or more additives such as plasticizers, process lubricants and heat stabilizers, fillers, reinforcement agents, and flame retardants are included. In certain compositions of the invention, from about 1 to about 10 weight percent monomeric or polymeric plasticizer (for example 1, 1.5, 2, 2.5, 3, 3.5, 4, 4.5, 5, 5.5, 6, 6.5, 7, 7.5, 8, 8.5, 9, 9.5, or weight percent); from about 0.1 to about 5 weight percent process lubricants and heat stabilizers (for example 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9; 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5 weight percent) from about 3 to about 40 weight percent fillers (for example about 4 to about 35 weight percent, about 5 to about 30 weight percent, about 6 to about 25 weight percent, about 7 to about 20 weight percent, about 8 to about 15 weight percent, 10 to about 40 weight percent); from about 5 weight percent to about 40 weight percent reinforcing agents (for example, about 10 to about 35 weight percent, about 15 to about 30 weight percent, or about 18 to about 25 weight percent; about 0.5 weight percent to about 10 weight percent nanocomposite reinforcing agents (for example, about 0.75 to about 9 weight percent, about 1 to about 8 weight percent about 2 to about 7 weight percent, about 3 to about 6 weight percent about 4 to about 8.5 weight percent about 5 to about 7.5 weight percent); and/or about 1 to about 40 weight percent flame retardants (for example about 2 to about 37 weight percent, about 3 to about 35 weight percent, about 4 to about 33 weight percent, about 5 to about 30 weight percent, about 6 to about 27 weight percent, about 7 to about 25 weight percent, about 8 to about 23 weight percent, about 9 to about 20 weight percent about 10 to about 18 weight percent, about 12 to about 36 weight percent, about 15 to about 40 weight percent).

Examples of suitable fillers include but are not limited to glass fibers and minerals such as precipitated calcium carbonate, ground calcium carbonate, talc, wollastonite, alumina trihydrate, wood flour, ground walnut shells, coconut shells, and rice husk shells and the like.

Tougheners

Tougheners are agents that are beneficial for polyhydroxyalkanoate blends because they aid in melt-processing the polyhydroxyalkanoate blends into a variety of articles having an improved level of toughness.

The typical approach to toughening a polymer is to add a second polymer to the polymer to be toughened. The second polymer is selected to have a glass transition temperature typically 20° C. to about 60° C. below that of the polymer to be modified (toughened).

For instance, U.S. Pat. No. 5,763,532 (Exxon Chemicals) describes the use of elastic alpha olefins to toughen polypropylene. U.S. Pat. No. 4,977,210 (BASF) references the use of ethylene-propylene polymers as tougheners for polypropylene. In both of these patents, the glass transition temperature of the toughening agent is substantially below that of the polypropylene homopolymer.

U.S. Pat. No. 5,859,137 (du Pont) discloses the use of ethylene ionomer resins to provide toughing of polyamide resin, while U.S. Pat. No. 5,681,899 (Exxon) cites the use of a halogenated copolymer and a rubber component to provide similar improvements. Again, in both of these patents the toughening component or blend has a low glass transition temperature relative to the polymer to be toughened.

U.S. Pat. No. 5,795,938 to BASF describes the use of a styrene-butadiene elastomer as a toughener for crystal polystyrene, and the elastomer component also has a low glass transition temperature.

Tougheners and impact modifiers for polymers have been mentioned in the literature. U.S. Pat. No. 7,354,973 to du Pont describes the use of ethylene copolymers as tougheners specifically for polylactic acid. In U.S. Pat. App. Pub. 2009/0191371, similar ethylene acrylate polymers were used as tougheners for polyhydroxybutyrate polymers. In these publications, the toughening agents contain high ethylene content and hence low glass transition temperatures. Further, U.S. Pat. No. 7,354,973 to du Pont discloses that these polymers provide a two-phase toughening mechanism since the clarity of the polyhydroxyalkanoate becomes impaired at relatively low addition levels. However, these toughening agents also seriously impair the biodegradability of the polyhydroxyalkanoate.

Using a polymer with a low Tg as a toughener, as described above, produces a two phase structure, where the toughening polymer is distributed within a matrix of the polymer to be toughened. Stresses are then transferred from the more brittle polymer to the toughing polymer.

Polyvinyl acetate (PVAc) homopolymer is not recognized as a toughening agent, since it has a Tg of 32° C. and produces a brittle film on its own. More durable films can be produced from polyvinyl acetate copolymers that include monomers that reduce the glass transition temperature of the random vinyl acetate copolymer. But these are not traditionally considered tougheners for polyester type resins, again because their glass transitions temperatures are typically much higher that those seen in traditional toughening technologies.

Polyvinyl acetate (PVAc) has a Tg of about +32° C., while PHA has a Tg from about +7° C. to about −30° C. The Tg of PVAc therefore dissuades one from viewing it as a potential toughener for PHAs in a typical two-phase system. Furthermore, PHB and PVAc are both frequently described individually as brittle polymers, so one would not expect that blending the two polymers together would provide a ductile material.

However, PVAc has been studied in blends with polyhydroxybutyrate (PHB) and polyhydroxybutyrate-co-valerate copolymers, in terms of its effect on crystallization of PHB (PHA is known to crystallize slowly). Such studies have examined the miscibility of PHB and PVAc homopolymers partially hydrolyzed polyvinyl acetate polymers (also known as vinyl acetate-co-vinyl alcohol polymers) and how these blends influence the rate of crystallization of the PHB component. These publications discuss the morphology, effect of the blends components on glass transition temperature and crystallization rates. None discuss the mechanical properties of such blends.

In general, it was found that PVAc slowed down the rate of crystallinity of PHB. For instance, Kulkarni et al. (ANTEC 1995) found that PVAc slowed down the rate of crystallization of PHB, and also slowed down the rate of biodegradation of PHB under composting conditions. Specifically, the enzymatic degradation of PHB (by *Penicillium funicolusim*) was inhibited. This was seen at rates of only 10% PVAc. Inclusion of PVAc was also found to reduce the crystallinity of PHBV (Chiu, H-J. J., 2006, *Appl. Polym. Sci.* 100:980-988; Hay et al., 2000, *Polymer* 41:5749-5757).

As disclosed herein, blending PVAc homopolymer or copolymer (Tg much higher than +7° C. eg +32° C.) with PHA (from about a Tg~+7° C. and below) provides a performance enhancement of toughening the PHA. This is unexpected as it does not follow the traditional mode of toughening.

The vinyl acetate homopolymers and copolymers used in the present invention are preferably produced through emulsion polymerization process with polyvinyl alcohol as the most common protective colloid, although nonionic stabilizers may be used. Vinyl acetate homopolymers and copolymers used in this invention can have molecular weights varying from about 10,000 Daltons to about 1,000,000 Daltons and contain from about 0.01 weight percent to about 15 weight percent polyvinyl alcohol as the preferred colloid stabilizer.

In certain embodiments, the about of vinyl acetate homopolymer or copolymer contain about 0.5 weight percent to about 12.5 weight percent, about 0.75 to about 10 weight percent, about 1 weight percent to about 8.5 weight percent, about 1.5 weight percent to about 14 weight percent, about 2 weight percent, about 3 weight percent, about 4 weight percent, about 5 weight percent, about 6 weight percent, about 7 weight percent, about 8 weight percent, about 9 weight percent, about 10 weight percent, about 11 weight percent, about 12 weight percent, about 13 weight percent, or about 14 about 3 weight percent, of polyvinyl alcohol.

The vinyl acetate tougheners include a vinyl acetate homopolymer or copolymer and at least one of the following monomers: ethylene (e.g., up to 14 percent by weight, for example about 0.1 weight percent to about 14 weight percent, about 0.5 to about 13 weight percent, about 1 weight percent to about 12 weight percent, about 2 weight percent to about 11 weight percent, about 3 weight percent to about 10 weight percent,), (meth)acrylic esters (esters of unbranched or branched alcohols having from 1 to 15 carbon atoms, e.g., methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate), vinyl esters having from 1 to 12 carbon atoms in the carboxylic acid radical (e.g., vinyl propionate, vinyl laurate, vinyl esters of alpha-branched carboxylic acids having from 9 to 13 carbon atoms), carboxyl-group-containing monomers (e.g., acrylic acid, methacrylic acid, crotonic acid, itaconic acid, fumaric acid, maleic acid, and salts thereof), glycidyl methacrylate, hydroxyethyl methacrylate, acrylamide, vinyl pyrollidone and vinyl alcohol.

Polyhydroxyalkanoates (PHAs)

Polyhydroxyalkanoates are biological polyesters synthesized by a broad range of natural and genetically engineered bacteria as well as genetically engineered plant crops (Braunegg et al., 1998, *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, 1996, *CHEMTECH* 26:38-44). Useful microbial strains for producing PHAs, include *Alcaligenes eutrophus* (renamed as *Ralstonia eutropha*), *Alcaligenes latus*, *Azotobacter*, *Aeromonas*, *Comamonas*, *Pseudomonads*, and genetically engineered organisms including genetically engineered microbes such as *Pseudomonas, Ralstonia* and *Escherichia coli.*

In general, a PHA is formed by enzymatic polymerization of one or more monomer units inside a living cell. Over 100 different types of monomers have been incorporated into the PHA polymers (Steinbüchel and Valentin, 1995, *FEMS Microbiol. Lett.* 128:219-228. Examples of monomer units incorporated in PHAs include 2-hydroxybutyrate, lactic acid, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HHep), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center.

In some embodiments, the PHA is a homopolymer (all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as PHB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting PHA is a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as PHB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units). An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The homopolymer (where all monomer units are identical) PHB and 3-hydroxybutyrate copolymers (PHB3HP, PHB4HB, PHB3HV, PHB4HV, PHB5HV, PHB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to −10° C., and a melting temperature $T_M$ of between 80° C. to 180° C. Type 2 PHB copolymers typically have a Tg of −20° C. to −50° C. and Tm of 55° C. to 90° C. and are based on PHB4HB, PHB5HV polymers with more than 15% 4HB, 5HV, 6HH content or blends thereof. In particular embodiments, the Type 2 copolymer have a phase component with a $T_g$ of −15° C. to −45° C. and no Tm.

Preferred Type 1 PHB copolymers have two monomer units have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 3HV; 12% 3HV; 13% 3HV; 14% 3HV; 15% 3HV; 16% 3HV; 17% 3HV; 18% 3HV; 19% 3HV; 20% 3HV; 21% 3HV; 22% 3HV; 23% 3HV; 24% 3HV; 25% 3HV.

PHB3HP is a Type 1 PHB copolymer where the 3HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP. 13% 3HP; 14% 3HP; 15% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 4HV; 9% 4HV; 10% 4HV; 11% 4HV; 12% 4HV; 13% 4HV; 14% 4HV; 15% 4HV; or 20% to 40% 4HV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4% 3HH; 5% 3HH; 6% 3HH; 7% 3HH; 8% 3HH; 9% 3HH; 10% 3HH; 11% 3HH; 12% 3HH; 13% 3HH; 14% 3HH; 15% 3HH; 16% 3HH; 17% 3HH; 18% 3HH; 19% 3HH; 20% 3HH; 21% 3HH; 22% 3HH; 23% 3HH; 24% 3HH; 25% 3HH.

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers have a 3HB content of between 80% and 5% by weight of the copolymer, for example 80%, 75%, 70%, 65%, 60%, 55%, 50%; 45%, 40%, 35%, 30%, 25%, 20%, 15%, 10%, 5% by weight of the copolymer.

PHB4HB is a Type 2 PHB copolymer where the 4HB content is in the range of 20% to 60% by weight of the copolymer and preferably in the range of 25% to 50% by weight of the copolymer for example: 25% 4HB; 30% 4HB; 35% 4HB; 40% 4HB; 45% 4HB; 50% 4HB by weight of the copolymer.

PHB5HV is a Type 2 PHB copolymer where the 5HV content is in the range of 20% to 60% by weight of the copolymer and preferably in the range of 25% to 50% by weight of the copolymer for example: 25% 5HV; 30% 5HV; 35% 5HV; 40% 5HV; 45% 5HV; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 45% 3HH; 50% 3HH; 55% 3HH, 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX; 50% 3HX; 55% 3HX; 60% 3HX; 65% 3HX; 70% 3HX; 75% 3HX; 80% 3HX; 85% 3HX; 90% 3HX by weight of the copolymer.

PHAs for use in the methods, compositions and pellets described in this invention are selected from: PHB or a Type 1 PHB copolymer; a PHA blend of PHB with a Type 1 PHB copolymer where the PHB content by weight of PHA in the PHA blend is in the range of 5% to 95% by weight of the PHA in the PHA blend; a PHA blend of PHB with a Type 2 PHB copolymer where the PHB content by weight of the PHA in the PHA blend is in the range of 5% to 95% by weight of the PHA in the PHA blend; a PHA blend of a Type 1 PHB copolymer with a different Type 1 PHB copolymer and where the content of the first Type 1 PHB copolymer is in the range of 5% to 95% by weight of the PHA in the PHA blend; a PHA blend of a Type 1 PHB copolymer with a Type 2 PHA copolymer where the content of the Type 1 PHB copolymer is in the range of 30% to 95% by weight of the PHA in the PHA blend; a PHA blend of PHB with a Type 1 PHB copolymer and a Type 2 PHB copolymer where the PHB content is in the range of 10% to 90% by weight of the PHA in the PHA blend, where the Type 1 PHB copolymer content is in the range of 5% to 90% by weight of the PHA in the PHA blend and where the Type 2 PHB copolymer content is in the range of 5% to 90% by weight of the PHA in the PHA blend.

The PHA blend of PHB with a Type 1 PHB copolymer is a blend of PHB with PHB3HP where the PHB content in the PHA blend is in the range of 5% to 90% by weight of the PHA in the PHA blend and the 3HP content in the PHB3HP is in the range of 7% to 15% by weight of the PHB3HP.

The PHA blend of PHB with a Type 1 PHB copolymer is a blend of PHB with PHB3HV where the PHB content of the PHA blend is in the range of 5% to 90% by weight of the PHA in the PHA blend and the 3HV content in the PHB3HV is in the range of 4% to 22% by weight of the PHB3HV.

The PHA blend of PHB with a Type 1 PHB copolymer is a blend of PHB with PHB4HB where the PHB content of the PHA blend is in the range of 5% to 90% by weight of the PHA in the PHA blend and the 4HB content in the PHB4HB is in the range of 4% to 15% by weight of the PHB4HB.

The PHA blend of PHB with a Type 1 PHB copolymer is a blend of PHB with PHB4HV where the PHB content of the PHA blend is in the range of 5% to 90% by weight of the PHA in the PHA blend and the 4HV content in the PHB4HV is in the range of 4% to 15% by weight of the PHB4HV.

The PHA blend of PHB with a Type 1 PHB copolymer is a blend of PHB with PHB5HV where the PHB content of the PHA blend is in the range of 5% to 90% by weight of the PHA in the PHA blend and the 5HV content in the PHB5HV is in the range of 4% to 15% by weight of the PHB5HV.

The PHA blend of PHB with a Type 1 PHB copolymer is a blend of PHB with PHB3HH where the PHB content of the PHA blend is in the range of 5% to 90% by weight of the PHA in the PHA blend and the 3HH content in the PHB3HH is in the range of 4% to 15% by weight of the PHB3HH.

The PHA blend of PHB with a Type 1 PHB copolymer is a blend of PHB with PHB3HX where the PHB content of the PHA blend is in the range of 5% to 90% by weight of the PHA in the PHA blend and the 3HX content in the PHB3HX is in the range of 4% to 15% by weight of the PHB3HX.

The PHA blend is a blend of a Type 1 PHB copolymer selected from the group PHB3HV, PHB3HP, PHB4HB, PHBV, PHV4HV, PHB5HV, PHB3HH and PHB3HX with a second Type 1 PHB copolymer which is different from the first Type 1 PHB copolymer and is selected from the group PHB3HV, PHB3HP, PHB4HB, PHBV, PHV4HV, PHB5HV, PHB3HH and PHB3HX where the content of the First Type 1 PHB copolymer in the PHA blend is in the range of 10% to 90% by weight of the total PHA in the blend.

The PHA blend of PHB with a Type 2 PHB copolymer is a blend of PHB with PHB4HB where the PHB content in the PHA blend is in the range of 30% to 95% by weight of the PHA in the PHA blend and the 4HB content in the PHB4HB is in the range of 20% to 60% by weight of the PHB4HB.

The PHA blend of PHB with a Type 2 PHB copolymer is a blend of PHB with PHB5HV where the PHB content in the PHA blend is in the range of 30% to 95% by weight of the PHA in the PHA blend and the 51-1V content in the PHB5HV is in the range of 20% to 60% by weight of the PHB5HV.

The PHA blend of PHB with a Type 2 PHB copolymer is a blend of PHB with PHB3HH where the PHB content in the PHA blend is in the range of 35% to 95% by weight of the PHA in the PHA blend and the 3HH content in the PHB3HH is in the range of 35% to 90% by weight of the PHB3HX.

The PHA blend of PHB with a Type 2 PHB copolymer is a blend of PHB with PHB3HX where the PHB content in the PHA blend is in the range of 30% to 95% by weight of the PHA in the PHA blend and the 3HX content in the PHB3HX is in the range of 35% to 90% by weight of the PHB3HX.

The PHA blend is a blend of PHB with a Type 1 PHB copolymer and a Type 2 PHB copolymer where the PHB content in the PHA blend is in the range of 10% to 90% by weight of the PHA in the PHA blend, the Type 1 PHB copolymer content of the PHA blend is in the range of 5% to 90% by weight of the PHA in the PHA blend and the Type 2 PHB copolymer content in the PHA blend is in the range of 5% to 90% by weight of the PHA in the PHA blend.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHBHX content in the PHA blend in the range of 5% to 90% by weight of the PHA in the PHA blend where the 3HX content in the PHBHX is in the range of 35% to 90% by weight of the PHBHX.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HV content in the PHA blend in the range 5% to 90% by weight of the PHA in the PHA blend, where the 3HV content in the PHB3HV is in the range of 3% to 22% by weight of the PHB3HV, and a PHB5HV content in the PHA blend in the range of 5% to 90% by weight of the PHA in the PHA blend where the 5HV content in the PHB5HV is in the range of 20% to 60% by weight of the PHB5HV.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB5HV content in the PHA blend in the range of 5% to 90% by weight of the PHA in the PHA blend and where the 5HV content in the PHB5HV is in the range of 30% to 90% by weight of the PHB5HV.

For example a PHA blend can have a PHB content in the PHA blend in the range of 10% to 90% by weight of the PHA in the PHA blend, a PHB4HB content in the PHA blend in the range 5% to 90% by weight of the PHA in the PHA blend, where the 4HB content in the PHB4HB is in the range of 4% to 15% by weight of the PHB4HB, and a PHB3HX content in the PHA blend in the range of 5% to 90% by weight of the PHA in the PHA blend and where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB4HV content in the PHA blend in the range 5% to 90% by weight of the PHA in the PHA blend, where the 4HV content in the PHB4HV is in the range of 3% to 15% by weight of the PHB4HV, and a PHB5HV content in the PHA blend in the range of 5% to 90% by weight of the PHA in the PHA blend where the 5HV content in the PHB5HV is in the range of 30% to 90% by weight of the PHB5HV.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB5HV content in the PHA blend in the range of 5% to 90% by weight of the PHA in the PHA blend where the 5HV content in the PHB5HV is in the range of 20% to 60% by weight of the PHB5HV.

For example a PHA blend can have a PHB content in the PHA blend in the range of 10% to 90% by weight of the PHA in the PHA blend, a PHB3HH content in the PHA blend in the range 5% to 90% by weight of the PHA in the PHA blend, where the 3HH content in the PHB3HH is in the range of 3% to 15% by weight of the PHB3HH, and a PHB3HX content in the PHA blend in the range of 5% to 90% by weight of the PHA in the PHA blend where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB3HX content in the PHA blend in the range of 5% to 90% by weight of the PHA in the PHA blend where the 3HX content in the PHB3HX is in the range of 35% to 90% by weight of the PHB3HX.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB4HB content in the PHA blend in the range of 5% to 90% by weight of the PHA in the PHA blend where the 4HB content in the PHB4HB is in the range of 20% to 60% by weight of the PHB4HB.

For example a PHA blend can have a PHB content in the PHA blend in the range of 10% to 90% by weight of the PHA in the PHA blend, a PHB3HX content in the PHA blend in the range 5% to 90% by weight of the PHA in the PHA blend, where the 3HX content in the PHB3HX is in the range of 3% to 12% by weight of the PHB3HX, and a PHB5HV content in the PHA blend in the range of 5% to 90% by weight of the PHA in the PHA blend where the 5HV content in the PHB5HV is in the range of 20% to 60% by weight of the PHB5HV.

The PHA blend is a blend as disclosed in U.S. Pub. App. No. 2004/0220355, by Whitehouse, published Nov. 4, 2004, which is incorporated herein by reference in its entirety.

Microbial systems for producing the PHB copolymer PHBV are disclosed in U.S. Pat. No. 4,477,654 to Holmes. Published PCT application WO 02/08428, by Skraly and Sholl, describes useful systems for producing the PHB copolymer PHB4HB. Useful processes for producing the PHB copolymer PHB3HH have been described (Lee et. al., 2000, *Biotechnology and Bioengineering* 67:240-244; Park et al., 2001, *Biomacromolecules* 2:248-254). Processes for producing the PHB copolymers PHB3HX have been described by Matsusaki et. al., (2000, *Biomacromolecules* 1:17-22).

In determining the molecular weight techniques such as gel permeation chromatography (GPC) can be used. In the methodology, a polystyrene standard is utilized. The PHA can have a polystyrene equivalent weight average molecular weight (in Daltons) of at least 500, at least 10,000, or at least 50,000 and/or less than 2,000,000, less than 1,000,000, less than 1,500,000, and less than 800,000. In certain embodiments, preferably the PHAs generally have a weight-average molecular weight in the range of 100,000 to 700,000. For example, the molecular weight range for PHB and Type 1 PHB copolymers for use in this application are in the range of 400,000 Daltons to 1.5 million Daltons as determined by GPC method and the molecular weight range for Type 2 PHB copolymers for use in the application 100,000 to 1.5 million Daltons.

In certain embodiments, the branched PHA can have a linear equivalent weight average molecular weight of from about 150,000 Daltons to about 500,000 Daltons and a polydispersity index of from about 2.5 to about 8.0. As used herein, weight average molecular weight and linear equivalent weight average molecular weight are determined by gel permeation chromatography, using, e.g., chloroform as both the eluent and diluent for the PHA samples. Calibration curves for determining molecular weights are generated using linear polystyrenes as molecular weight standards and a 'log MW vs. elution volume' calibration method.

Branched Polyhydroxyalkanoates

The term "branched PHA" refers to a PHA with branching of the chain and/or cross-linking of two or more chains. Branching on side chains is also contemplated. Branching can be accomplished by various methods. Polyhydroxyalkanoate polymer described above can be branched by branching agents by free-radical-induced cross-linking of the polymer. In certain embodiment, the PHA is branched prior to combination in the method. In other embodiments, the PHA is reacted with peroxide in the methods of the invention. The branching increases the melt strength of the polymer. Polyhydroxyalkanoate polymers can be branched in any of the ways described in U.S. Pat. Nos. 6,620,869, 7,208,535, 6,201,083, 6,156,852, 6,248,862, 6,201,083 and 6,096,810 all of which are incorporated herein by reference in their entirety.

The polymers of the invention can also be branched according to any of the methods disclosed in International Publication No. WO 2010/008447, titled "Methods For Branching PHA Using Thermolysis" or International Publication No. WO 2010/008445, titled "Branched PHA Compositions, Methods For Their Production, And Use In Applications," both of which were published in English on Jan. 21, 2010, and designated the United States. These applications are incorporated by reference herein in their entirety.

Branching Agents

The branching agents, also referred to a free radical initiator, for use in the compositions and methods described herein include organic peroxides. Peroxides are reactive molecules, and can react with linear PHA molecules or previously branched PHA by removing a hydrogen atom from the polymer backbone, leaving behind a radical. PHA molecules having such radicals on their backbone are free to combine with each other, creating branched PHA molecules. Branching agents are selected from any suitable initiator known in the art, such as peroxides, azo-derivatives (e.g., azo-nitriles), peresters, and peroxycarbonates. Suitable peroxides for use in the present invention include, but are not limited to, organic peroxides, for example dialkyl organic peroxides such as 2,5-dimethyl-2,5-di(t-butylperoxy) hexane, 2,5-bis(t-butylperoxy)-2,5-dimethylhexane (available from Akzo Nobel as TRIGANOX 101), 2,5-dimethyl-di(t-butylperoxy)hexyne-3, di-t-butyl peroxide, dicumyl peroxide, benzoyl peroxide, di-t-amyl peroxide, t-amylperoxy-2-ethylhexylcarbonate (TAEC), t-butyl cumyl peroxide, n-butyl-4,4-bis(t-butylperoxy)valerate, 1,1-di(t-butylperoxy)-3,3,5-trimethyl-cyclohexane, 1,1-bis(t-butylperoxy)-3,3,5-trimethylcyclohexane (CPK), 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)butyrate, t-butylperoxy-acetate, t-amylperoxyacetate, t-butylperoxybenzoate, t-amylperoxybenzoate, di-t-butyldiperoxyphthalate, and the like. Combinations and mixtures of peroxides can also be used. Examples of free radical initiators include those mentioned herein, as well as those described in, e.g., *Polymer Handbook*, 3$^{rd}$ Ed., J. Brandrup & E. H. Immergut, John Wiley and Sons, 1989, Ch. 2. Irradiation (e.g., e-beam or gamma irradiation) can also be used to generate PHA branching.

The efficiency of branching and crosslinking of the polymer(s) can also be significantly enhanced by the dispersion of organic peroxides in a cross-linking agent, such as a polymerizable (i.e., reactive) plasticizers. The polymerizable plasticizer should contain a reactive functionality, such as a reactive unsaturated double bond, which increases the overall branching and crosslinking efficiency.

As discussed above, when peroxides decompose, they form very high energy radicals that can extract a hydrogen atom from the polymer backbone. These radicals have short half-lives, thereby limiting the population of branched molecules that is produced during the active time period.

Epoxy Functional Compounds

"Epoxy functional compound" as used herein is a compound with two or more epoxide groups capable of increasing the melt strength of polyhydroxyalkanoate polymers by branching, e.g., end chain branching.

Such epoxy functional compounds can include epoxy-functional, styrene-acrylic polymers (such as, but not limited to, e.g., JONCRYL® ADR-4368 (BASF), or MP-40 (Kaneka)), acrylic and/or polyolefin copolymers and oligomers containing glycidyl groups incorporated as side chains (such as, but not limited to, e.g., LOTADER® (Arkema), poly(ethylene-glycidyl methacrylate-co-methacrylate)), and epoxidized oils (such as, but not limited to, e.g., epoxidized soybean, olive, linseed, palm, peanut, coconut, seaweed, cod liver oils, or mixtures thereof, e.g., Merginat ESBO (Hobum, Hamburg, Germany) and EDENOL® B 316 (Cognis, Dusseldorf, Germany)).

For example, reactive acrylics or functional acrylics cross-linking agents are used to increase the molecular weight of the polymer in the branched polymer compositions described herein. Such cross-linking agents are sold commercially. BASF, for instance, sells multiple compounds under the trade name "JONCRYL®," which are described in U.S. Pat. No. 6,984,694 to Blasius et al., "Oligomeric chain extenders for processing, post-processing and recycling of condensation polymers, synthesis, compositions and applications," incorporated herein by reference in its entirety. One such compound is JONCRYL® ADR-4368CS, which is styrene glycidyl methacrylate and is discussed below. Another is MP-40 (Kaneka). And still another is Petra line from Honeywell, see for example, U.S. Pat. No. 5,723,730. Such polymers are often used in plastic recycling (e.g., in recycling of polyethylene terephthalate) to increase the molecular weight (or to mimic the increase of molecular weight) of the polymer being recycled. Such polymers often have the general structure:

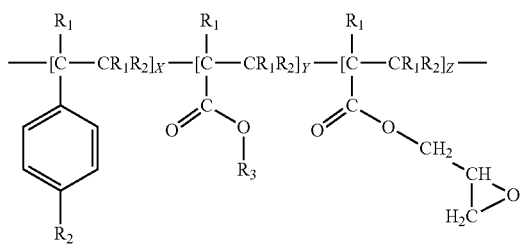

$R_1$ and $R_2$ are H or alkyl
$R_3$ is alkyl
x and y are 1-20
z is 2-20

E.I. du Pont de Nemours & Company sells multiple reactive compounds under the trade name Elvaloy®, which are ethylene copolymers, such as acrylate copolymers, elastomeric terpolymers, and other copolymers. One such compound is Elvaloy PTW, which is a copolymer of ethylene-n-butyl acrylate and glycidyl methacrylate. Omnova sells similar compounds under the trade names "SX64053," "SX64055," and "SX64056." Other entities also supply such compounds commercially.

Specific polyfunctional polymeric compounds with reactive epoxy functional groups are the styrene-acrylic copolymers and oligomers containing glycidyl groups incorporated as side chains. These materials are based on oligomers with styrene and acrylate building blocks that have glycidyl groups incorporated as side chains. A high number of epoxy groups per oligomer chain are used, for example 10, greater than 15, or greater than 20. These polymeric materials generally have a molecular weight greater than 3000, specifically greater than 4000, and more specifically greater than 6000. These are commercially available from Johnson Polymer, LLC (now owned by BASF) under the trade name JONCRYL, ADR 4368 material. Other types of polyfunctional polymer materials with multiple epoxy groups are acrylic and/or polyolefin copolymers and oligomers containing glycidyl groups incorporated as side chains. A further example of a such polyfunctional carboxy-reactive material is a co- or ter-polymer including units of ethylene and glycidyl methacrylate (GMA), available under the trade name LOTADER® resin, sold by Arkema. These materials can further comprise methacrylate units that are not glycidyl. An example of this type is poly(ethylene-glycidyl methacrylate-co-methacrylate).

Fatty acid esters or naturally occurring oils containing epoxy groups (epoxidized) can also be used. Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g., Merginat® ESBO from Hobum, Hamburg, or Edenol® B 316 from Cognis, Dusseldorf), but others may also be used.

Other examples include, poly(ethylene-co-methacrylate-coglycidyl methacrylate), ethylene-n-butyl acrylate-glycidyl methyl acetate copolymer. poly(ethylene-co-glycidyl-methaacrylate), poly(ethylene-co-methaacrylate-coglycidyl methacrylate), poly(ethylene-glycidyl methacrylate-co-methacrylate ethylene/vinyl acetate/carbon monoxide copolymers, and ethylene/n-butyl acetate/carbon monoxide or combinations.

Nucleating Agents

If desired, an optional nucleating agent is added to the PHA (for example the branched PHA) to aid in its crystallization. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); phosphoric or phosphorous acid and its metal salts, such as diphenyl phosphate, diphenyl phosphite, metal salts of bis(4-tert-butylphenyl)phosphate, and methylene bis-(2,4-tert-butylphenyl) phosphate; sorbitol derivatives such as bis(p-methylbenzylidene) sorbitol and bis(p-ethylbenzylidene) sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

In certain embodiments, the nucleating agent is selected from: cyanuric acid, carbon black, mica talc, silica, boron nitride, clay, calcium carbonate, synthesized silicic acid and salts, metal salts of organophosphates, and kaolin. In particular embodiments; the nucleating agent is cyanuric acid.

In various embodiments, where the nucleating agent is dispersed in a liquid carrier, the liquid carrier is a plasticizer, e.g., a citric compound or an adipic compound, e.g., acetyl-citrate tributyrate (CITROFLEX® A4, Vertellus, Inc., High Point, N.C.), or DBEEA (dibutoxyethoxyethyl adipate), a surfactant, e.g., Triton X-100, TWEEN-20, TWEEN-65, Span-40 or Span 85, a lubricant, a volatile liquid, e.g., chloroform, heptane, or pentane, a organic liquid or water.

In other embodiments, the nucleating agent is aluminum hydroxy diphosphate or a compound comprising a nitrogen-containing heteroaromatic core, such as that described in U.S. Published Application NO. 2005/0209377 A1, which incorporated by reference herein in its entirety.

In particular embodiments, the nucleating agent can include aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole. The nucleant can have a chemical formula selected from the group consisting of

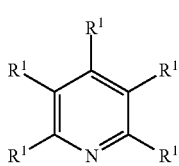
Formula 1

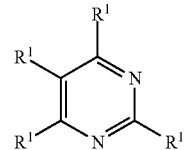
Formula 2

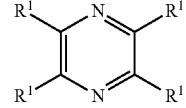
Formula 3

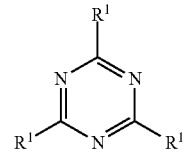
Formula 4

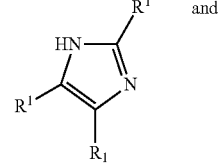
Formula 5
and

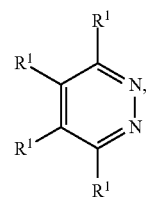
Formula 6 and combinations thereof, wherein each R1 is independently H, $NR^2R^2$, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

Another nucleating agent for use in the compositions and methods described herein are milled as described in International Publication No. WO 2009/129499, published in English on Oct. 22, 2009, and which designates the United States, which is herein incorporated by reference in its entirety. Briefly, the nucleating agent is milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent is milled in liquid carrier until at least 10% of the cumulative solid volume, at least 20% of the cumulative solid volume, at least 30% or at least 40%-50% of the nucleating agent can exist as particles with a particle size of 5 microns or less, 2 microns or less or 1 micron or less. In alternative embodiments, the nucleating agents are milled by other methods, such as jet milling and the like. Additionally, other methods are utilized that reduce the particle size.

The cumulative solid volume of particles is the combined volume of the particles in dry form in the absence of any other substance. The cumulative solid volume of the particles is determined by determining the volume of the particles before dispersing them in a polymer or liquid carrier by, for example, pouring them dry into a graduated cylinder or other suitable device for measuring volume. Alternatively, cumulative solid volume is determined by light scattering.

Additives

Also to be considered is whether the composition includes other additives. With any polymeric resin-based compound, additives provide easier processing and a more desirable final appearance and properties for the compound.

The additive can be any compound known to those of skill in the art to be useful in the production of polymeric articles. Exemplary additives include, e.g., plasticizers (e.g., to increase flexibility of the polymeric composition), antioxidants (e.g., to protect the polymeric composition from degradation by ozone or oxygen), ultraviolet stabilizers (e.g., to protect against weathering), lubricants (e.g., to reduce friction), pigments (e.g., to add color to the polymeric composition), flame retardants, fillers, antistatic agents, reinforcing agents, and/or mold release agents. Optimal amounts to be added will depend on various factors known to skilled practitioners, e.g., cost, desired physical characteristics of the polymeric composition (e.g., mechanical strength), and the type of processing to being performed (raising, e.g., considerations of line speeds, cycle times, and other processing parameters). It is well within the skilled practitioner's abilities to determine whether an additive should be included in a polymeric composition and, if so, what additive and the amount that should be added to the composition.

For instance, the compositions of the present invention may further comprise other additives such as about 1 to about 10 weight percent monomeric or polymeric plasticizer; about 0.1 to about 5 weight percent process lubricants and heat stabilizers; about 3 to about 40 weight percent fillers; about 5 weight percent to about 40 weight percent reinforcing agents; about 0.5 weight percent to about 10 weight percent nanocomposite reinforcing agents; and/or about 1 to about 40 weight percent flame retardants. Examples of suitable fillers include glass fibers and minerals such as precipitated calcium carbonate, ground calcium carbonate, talc, wollastonite, alumina trihydrate, wood flour, ground walnut shells, coconut shells, rice husk shells and the like.

Nucleating agents can be used to control the rate at which the polymer crystallizes. Plasticizers are used to aid processing, change the glass transition temperature and modulus of the composition. Surfactants are generally used to de-dust, lubricate, reduce surface tension, and/or densify. Lubricants are normally used to reduce sticking to hot processing metal surfaces. Binders can beneficially unite the other components within the polymer. Fillers ordinarily are used to reduce cost and gloss. Antioxidants can be used to prevent aging and embrittlement of the polymer Impact modifiers are useful in rigid polymers to increase toughness. Pigments and colorants can be organic, or can be minerals such as titanium dioxide, and can be opacifying pigments, or tinting pigments.

Clays are also useful as additives, for instance, nanoclay or organically modified clay can be added to a polymeric composition. There are several types of clays used in polymeric compositions, including cationic or medium or high cation exchange capacity. The cation exchange capacity is generally reported as the number of milliequivalents of exchangeable base which can be exchanged per 100 grams of clay. The cation exchange capacity varies from about 50 to about 150 depending on the type of clay. Examples of clays which can be organically modified include sepiolite, attapulgite, montmorillonites, bentonites, saponite and nentronite.

Organically modified clays are known in the art and are also described in U.S. Pat. No. 2,531,440. Examples include montmorillonite clay modified with ternary or quaternary ammonunium salts. Nanoclays are commercially available from Southern Clay Products, Inc. of Gonzales, Tex., USA (such as, but not limited to, Cloisite®NA$^+$ (a natural montmorillonite), Cloisite® 93A & 30B (a natural montmorillonite modified with ternary ammonium salts), and Cloisite® 10A, 15A, 20A, and 25A (a natural montmorillonite modified with quaternary ammonium salts).

Montmorillonite clay is the most common member of the smectite family of nanoclays. Smectites have a unique morphology, featuring one dimension in the nanometer range. The montmorillonite clay particle is often called a platelet, which is a sheet-like structure where the dimensions in two directions far exceed the particle's thickness. The length and breadth of the particles range from 1.5 microns down to a few tenths of a micrometer. However, the thickness is only about a nanometer. These dimensions result in extremely high average aspect ratios (on the order of 200-500). Moreover, the very small size and thickness mean that a single gram of clay can contain over a million individual particles.

The clay initially comprises agglomerates of platelet layers. Nanoclay becomes commercially useful if processed into an intercalate, which separates (exfoliates) the platelets in the agglomerates. In an intercalate, the clay is mixed with an intercalate under conditions which cause the platelets to separate and the intercalate to enter into the spaces between the platelets. The intercalant is often an organic or semi-organic chemical capable of entering the montmorillonite clay gallery and bonding to the surface of the platelets. An intercalate is therefore a clay-chemical complex wherein the clay gallery spacing has increased, due to the process of surface modification by the substance (the intercalant). Under the proper conditions of temperature and shear, the platelet agglomerates are capable of exfoliating (separating), allowing the intercalant to enter between them, separating and exfoliating them.

The platelets can be exfoliated (separated) by a number of processes. In one exfoliation procedure, described in U.S. Pat. No. 6,699,320, the process utilizes a dispersant to enter between the layers of clay platelets and separate them. In this process, the clay is mixed with a dispersant (e.g., castor wax), and then heated in the barrel of an extruder to a temperature above the melting point of the dispersant (e.g., 82° C.-104° C. in the case of castor wax). The heated mixture is then agitated, e.g., with a deep flighted screw. This heating and agitating disperses the platelet layers and delaminates the platelets from neighboring layers, by allowing molecules of dispersant to enter between the layers. The layers are considered "exfoliated" when the separation between the platelet layers is large enough such that there is no longer sufficient attraction between layers to cause uniform spacing between the layers.

In the process described in U.S. Pat. No. 6,699,320, the screw within the extruder moves the clay-wax mixture out of an extrusion die opening in the form of a hot slurry. Two chilled chrome-plated rollers are then used to calender the mixture to a predetermined thickness that is determined by the spacing between the rollers. The mixture is cooled to solidify the wax. The clay-wax mixture is then scraped off the rollers and falls as flakes onto a conveyer belt. The flakes can be tumbled to further reduce their size, and used immediately, or stored.

Because of the very small size of the clay particles, nanoclays are difficult to handle, and may pose health risks. They are therefore sometimes processed into "masterbatches," in which the clay is dispersed into a polymer resin at a high concentration. Portions of the masterbatch are then added in measured quantities to polymer that does not contain nanoclay, to produce a polymer containing a precise amount of the nanoclay.

One montmorillonite clay is Cloisite® 25A, which can be obtained from Southern Clay Products of Gonzales, Tex., USA. A typical dry particle size distribution of Cloisite® 25A is 10% less than 2 microns, 50% less than 6 microns, and 90% less than 13 microns. Other nanoclays are identified in U.S. Pat. No. 6,414,070 (Kausch et al.), which is incorporated herein by reference in its entirety, and PCT Patent Publications WO 00/66657 and WO 00/68312.

Application of Compositions

For the fabrication of useful articles, the toughened composition is typically processed at a temperature near the crystalline point of the PHA to minimize molecular weight loss. Additives are chosen to be stable at these temperatures. While melted, the composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding (rotomolding), casting (e.g., cast sheet, cast film), or thermoforming.

The toughened PHA composition is used to create, without limitation, a wide variety of useful products, e.g., automotive, consumer durable, construction, electrical, medical, and packaging products. For instance, the polymeric compositions is used to make, without limitation, films (e.g., packaging films, agricultural film, mulch film, erosion control, hay bale wrap, slit film, food wrap, pallet wrap, protective automobile and appliance wrap, etc.), golf tees, caps and closures, agricultural supports and stakes, paper and board coatings (e.g., for cups, plates, boxes, etc.), thermoformed products (e.g., trays, containers, lids, yoghurt pots, cup lids, plant pots, noodle bowls, moldings, etc.), housings (e.g., for electronics items, e.g., cell phones, PDA cases, music player cases, computer cases and the like), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), injection moldings (writing instruments, utensils, disk cases, etc.), solution and spun fibers and melt blown fabrics and non-wovens (threads, yarns, wipes, wadding, disposable absorbent articles), blow moldings (deep containers, bottles, etc.) and foamed articles (cups, bowls, plates, packaging, etc.).

Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Branching the polymer as described herein increases the melt strength of the polymer so that the sheet maintains is more readily processed and maintains its structural integrity. Measuring the sag of a sample piece of polymer when it is heated is therefore a way to measure the relative size of this processing window for thermoforming.

Molded products include a number of different product types and, for example, including products such as disposable spoons, forks and knives, tubs, bowls, lids, cup lids, yogurt cups, and other containers, bottles and bottle-like containers, etc.

Blow molding is similar to thermoforming and is used to produce deep draw products such as bottles and similar products with deep interiors.

The toughened PHA compositions described herein are provided in any suitable form convenient for an intended application. For example, toughened PHA is provided in pellet form to subsequently produce films, coatings, moldings or other articles, or the films, coatings, moldings and other articles are is made directly as the toughened PHA is produced.

Annealing

Post-fabrication heat treating (e.g., annealing) of polyhydroxyalkanoate film produced by the methods and compositions described herein produces a film with increases in puncture and tear resistance. Such increases are not seen in other polymeric films, e.g., polyethylene. Such annealing is used to increase the toughness of injection moldings.

For instance, PHA films are treated for about 10 to about 120 minutes at temperatures of about 80° C. to about 120° C. Such treatment improves the puncture resistance of the films up to 16-fold, while tear resistance could be improved by up to 35-fold (transverse direction) and up to 65-fold (machine direction).

Although various PHAs are capable of being processed on conventional processing equipment, many problems have been found with the polymers that impede their commercial acceptance. These include brittleness and age-related brittleness. For instance the mechanical properties of articles made from polyhydroxyalkanoate polymers are known to change over time, during storage at ambient conditions. Specifically, the impact toughness and tensile elongation at break ($\epsilon_b$) are known to decrease systematically over time. The exact reasons for this decrease are not known. This age-related increase in brittleness limits the commercial applications available for use of the polymer. In addition, the crystallization kinetics of the polymer are poorly understood, and longer cycle times (relative to polyethylene and polypropylene) are often required during processing of these polymers, further limiting their commercial acceptance. Post-fabrication heat treating (e.g., annealing) provides benefits to the mechanical properties of the PHA compositions. These mechanical properties include strength and tear resistance.

As disclosed herein, "annealing" and "heat treatment" means a treatment where polyhydroxyalkanoate polymer processed to a product in nonliquid form is subsequently (i.e., after the film is formed) heated for a period of time. This has been found to provide surprising and unexpected properties of puncture toughness and tear resistance in PHA films. Preferably the flat film is heated to about 80° C. to about 140° C. for about 5 seconds to about 90 minutes, more preferably to about 90° C. to about 130° C. for about 10 minutes to about 70 minutes, and most preferably to about 110° C. to about 125° C. for about 15 minutes to about 60 minutes. This has been found to provide surprising and unexpected properties of puncture toughness and tear resistance in PHA films Increased toughness is also seen in injection moldings.

For instance, flat polyhydroxyalkanoate film is annealed at 120° C. for 10 seconds. This is accomplished, for instance, in-line by forming the film in any of a variety of ways, and then running the film through an oven that is maintained at the appropriate temperature. The oven is long enough so that between entering and exiting the oven, the film is exposed to the heat for the appropriate amount of time. Alternatively, the film is "snaked" through the oven, e.g., back and forth on a series of rollers within the oven, so that the film is exposed to the heat for the appropriate amount of time before exiting the oven.

In practice, the actual time of the overall treatment may be longer. For polyhydroxyalkanoate film that has collected on standard rolls prior to treatment, for instance, the film at the interior of the roll will not be immediately exposed to the temperature needed to cause annealing, and the film at the interior of the roll will not exhibit the beneficial properties disclosed herein. The entire roll must therefore be maintained at the necessary temperature for a time sufficient for the polymer at the interior of the roll to experience the annealing temperatures. Alternatively, the film could be exposed to the appropriate temperatures after being made, but before being wound onto a roll. In such a situation, the film need only be exposed to the annealing temperature for the time necessary for the area being treated to come up to the appropriate temperature. The film is exposed to temperatures very close to the melting point of the polymer(s) making up the film. In practice, however, this is best done with flat film, as a large roll of film could begin to stick to itself.

Similar methods can be used for annealing injection moldings.

Without wishing to be limited by theory, it may be that when polyhydroxyalkanoate film is made, the crystallization is not fully complete, and continues for some time thereafter. Late crystallization may cause internal shrinkage stresses, i.e., a form of "necking in" at the molecular level. If so, then such stresses may reduce the puncture toughness and tear resistance of the film. The heat treatment as described herein may relieve some of these internal stresses.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Materials

The polyvinyl acetate materials (PVAc) were supplied by Wacker Chemie AG and by Kuraray America Inc. A brief description of each of the materials is given below:
- VINNEX® LL2504 (Wacker Chemie AG): polyvinyl acetate-ethylene copolymer, $T_g=-7°$ C. and very high molecular weight.
- VINNEX® LL2510 (Wacker Chemie AG): polyvinyl acetate-ethylene terpolymer, $T_g=42°$ C. and very high molecular weight.
- VINNAPAS® UW10F (Wacker Chemie AG): polyvinyl acetate homopolymer, $T_g=44°$ C., $M_w=330\text{-}430,000$ g/mole.
- VINNAPAS® B60 (Wacker Chemie AG): polyvinyl acetate homopolymer, $T_g=42°$ C., $M_w=55\text{-}70,000$ g/mole.

The PHA materials used were either a copolymer of 3-hydroxybutyrate and 4-hydroxybutyrate (P3HB-4HB) with 8-14% 4HB or PHA blends. PHA Blend #1 was composed of about 58-62% homopolymer of 3-hydroxybutyrate, and about 38-42% co-polymer of 3-hydroxybutyrate and 4-hydroxybutyrate, where the 4-hydroxybutyrate was approximately 8-14% by weight. PHA Blend #2 was composed of about 34-38% homopolymer of 3-hydroxybutyrate, 22-26% copolymer of 3-hydroxybutyrate and 4-hydroxybutyrate where the 4-hydroxybutyrate was 8-14% and 38-42% copolymer of 3-hydroxybutyrate and 4-hydroxybutyrate where the 4-hydroxybutyrate was 25-33% by weight.

Methods

Ductility/Toughness Assessment of Blends of the Invention

Ductility is a mechanical property defined as the extent to which a material can deform permanently under an applied stress (bend, stretch or compression) without fracturing. It is directly related to the toughness which is a measure of the amount of energy a material can absorb before fracturing. Toughness is usually measured by integrating the area under the stress-strain curve during tensile testing.

To determine the ductility or toughness of the PHA/PVAc film blends, they were first compounded on a Randcastle extruder at 170° C. to produce a cast film approximately 0.2 to 0.5 mm thick and conditioned under ambient conditions (20-25° C., 50-60% RH) for 7 days to fully develop crystallinity.

Injection molded bars were also prepared using a Roboshot injection molder with front/middle/rear/nozzle/mold temperatures set at 165° C./165° C./160° C./160° C./60° C., clamp pressure 110,000 psi, back pressure 850 psi, screw speed 150 rpm. After injection molding, the bars were dried at 50° C. for 48 hrs prior to Tensile and Notched Izod testing.

Qualitative Tear Test for Films: The toughness of PHA/PVAc film blends was assessed using a qualitative tear test. The side and edge of a film to be tested were first cut with scalpel to a depth of 2 mm then the film was manually twisted by 90 degree around the cut notch. The ease at which the film tore was noted. No tearing or considerable force required to propagate a tear was considered an indication of a high degree of ductility or toughness.

Tensile Properties, Notched Izod Impact and Tear Strength Testing of Injection Molded Bars Tensile modulus, strength and elongation on the molded bars were measured following the ASTM D638 method. Notched Izod impact by pendulum was measured using method ASTM D256 while tear strength by pendulum was measured using method ASTM D1922.

Measurement of Thermal Properties

The glass transition ($T_g$) and peak crystallization temperature ($T_c$) were measured using a TA Instruments Q100 Modulated Differential Scanning calorimeter (MDSC) with autosampler. For each measurement, 8-12 mg of a blend sample was weighed into an aluminum pan and sealed with an aluminum lid. The sample was then placed in the DSC under a nitrogen purge and analyzed using a modulated heat-cool cycle. The heating/cooling range was −70° C. to 200° C. with a heating rate of 3° C./min and a cooling rate of 10° C./min. The modulation was carried out using a 1° C. oscillation every 60 seconds. $T_g$ was calculated from the modulated heating cycle by choosing the midpoint of the baseline shift while $T_c$ was determined from the cooling cycle by taking the peak temperature during crystallization of the sample.

Example 1

High Modulus PHA Film Blends

In this example, three vinyl acetate polymers from Wacker Chemie AG (Germany) were tested for their ability to toughen polyhydroxyalkanoate. The vinyl acetate polymers used in the blend included VINNEX® LL2510, VINNIPAS® B60 and VINNEX® LL2504. These three vinyl acetates varied in $T_g$, molecular weight and composition. Their effect on PHA film toughness is shown in Tables 1a-c. Note that the formulation components are given in weight percent.

TABLE 1a

High Modulus Polyhydroxyalkanoate Formulations Containing Vinyl Acetate-Ethylene Terpolymer VINNEX ® LL2510.

| Formulation | 1 | 2 | 3 | 4 |
|---|---|---|---|---|
| P3HB-4HB (8-14% 4HB) | 97 | 87.7 | 78.2 | 59 |
| Nucleating Agent Masterbatch | 3 | 2.6 | 2.3 | 1.8 |
| VINNEX ® LL2510 | 0 | 19.5 | 19.5 | 39.2 |
| Tear Toughness | brittle | tough | very tough | very tough |
| Tg Midpoint (° C.) | −11.8 | −3.4 | 2.1 | 10.8 |
| Tc peak (° C.) | 112.2 | 106.9 | 105.4 | 102.6 |

TABLE 1b

High Modulus Polyhydroxyalkanoate Formulations Containing Vinyl Acetate Homopolymer VINNAPAS ® B60.

| Formulation | 1 | 5 | 6 | 7 |
|---|---|---|---|---|
| P3HB-4HB (8-14% 4HB) | 97 | 87.7 | 78.2 | 59 |
| Nucleating Agent Masterbatch | 3 | 2.6 | 2.3 | 1.8 |
| VINNAPAS ® B60 | | 9.7 | 19.5 | 39.2 |
| Tear Toughness | brittle | tough | tough | very tough |
| Tg Midpoint (° C.) | −11.8 | −4.7 | −11.7 | −12.3 |
| Tc peak (° C.) | 112.2 | 106.0 | 106.7 | 104.4 |

TABLE 1c

High Modulus Polyhydroxyalkanoate Formulations Containing Vinyl Acetate-Ethylene copolymer VINNEX ® LL2504.

| Formulation | 1 | 8 | 9 | 10 |
|---|---|---|---|---|
| P3HB-4HB (8-14% 4HB) | 97 | 87.7 | 78.2 | 59 |
| Nucleating Agent Masterbatch | 3 | 2.6 | 2.3 | 1.8 |
| VINNEX ® LL2504 | | 9.7 | 19.5 | 39.2 |
| Tear Toughness | brittle | tough | very tough | very tough |
| Tg Midpoint (° C.) | −11.8 | −3.5 | 1.2 | 11.2 |
| Tc peak (° C.) | 112.2 | 107.0 | 105.7 | 103.2 |

The nucleating masterbatch contained cyanuric acid that had been previously compounded at a rate of 33% (by weight) into a base resin of 3-hydroxybutyrate-co-4-hydroxybutyrate, and pelleted.

The results achieved with the above formulations demonstrated that when vinyl acetate homopolymers or copolymers were added to high modulus PHA blends, the toughness of those blends increased with increasing polyvinyl acetate resin content. All compositions showed a single glass transition temperature, indicating a high degree of miscibility between the polyhydroxyalkanoate and vinyl acetate polymer phases. The formulations containing VINNEX® LL2510 and VINNEX® LL2504 showed an increase in glass transition temperature with increasing vinyl acetate content. The toughness also increased, contrary to what one might expect from the usual immiscible-phase approach for toughening polymers.

In all cases the rate of crystallization measured by DSC cooling showed a lower peak crystallization temperature and hence slower crystallization, although the reduction was not significant enough to impact the processing characterization of the formulations.

Example 2

Lower Modulus PHA Film Blends

In this example a lower modulus polyhydroxyalkanoate was selected for blending with the vinyl acetate polymers. Tables 2a-c show the formulations made as well as the thermal and tear toughness properties for the films

TABLE 2a

Lower Modulus Polyhydroxyalkanoate Formulations Containing Vinyl Acetate Homopolymer VINNEX ® LL2510.

| Formulation | 11 | 12 | 13 | 14 |
|---|---|---|---|---|
| PHA Blend #2 | 97 | 87.7 | 78.2 | 59 |
| Nucleating Agent Masterbatch | 3 | 2.6 | 2.3 | 1.8 |
| VINNEX ® L2510 | 0 | 9.7 | 19.5 | 39.6 |
| Tear Toughness | tough | very tough | extremely tough | extremely tough |
| Tg Midpoint (° C.) | −19.9 | −17.4 | −11.6 | 0.5 |
| Tc peak (° C.) | 104.4 | 105.8 | 100.7 | 97.5 |

TABLE 2b

Lower Modulus Polyhydroxyalkanoate Formulations Containing Vinyl Acetate Homopolymer VINNAPAS ® B60.

| Formulation | 11 | 15 | 16 | 17 |
|---|---|---|---|---|
| PHA Blend #2 | 97 | 87.7 | 78.2 | 59 |
| Nucleating Agent Masterbatch | 3 | 2.6 | 2.3 | 1.8 |
| VINNAPAS ® B60 | 0 | 9.7 | 19.5 | 39.6 |
| Tear Toughness | tough | extremely tough | extremely tough | extremely tough |
| Tg Midpoint (° C.) | −19.9 | −16.8 | −17.1 | −17.4 |
| Tc peak (° C.) | 104.4 | 99.8 | 101.7 | 102.1 |

TABLE 2c

Lower Modulus Polyhydroxyalkanoate Formulations Containing Vinyl Acetate Homopolymer VINNEX ® LL2504.

| Formulation | 11 | 18 | 19 | 20 |
|---|---|---|---|---|
| PHA Blend #2 | 97 | 87.7 | 78.2 | 59 |
| Nucleating Agent Masterbatch | 3 | 2.6 | 2.3 | 1.8 |
| VINNEX ® LL2504 | 0 | 9.7 | 19.5 | 39.6 |
| Tear Toughness | tough | very tough | extremely tough | extremely tough |
| Tg Midpoint (° C.) | −19.9 | −16.2 | −15.9 | −15.7 |
| Tc peak (° C.) | 104.4 | 89.5 | 100.3 | 96.9 |

The nucleating masterbatch was cyanuric acid that had been previously compounded at a rate of 33% (by weight) into a base resin of 3-hydroxybutyrate and 4-hydroxybutyrate, and pelleted.

In all cases, an improvement in tear toughness was observed with addition of the vinyl acetate polymers even with an increase in glass transition temperature for the blends. Addition of VINNAPAS® LL2510 showed the largest impact on the $T_g$ for the blends while the VINNAPAS® B60 showed the largest impact on the tear toughness. Crystallization rates were slightly slower for the PHA/PVAc blends but not sufficient to affect the conversion to fabricated products.

Example 3

Injection Molding Formulations

The following formulations were developed for injection molded articles.

TABLE 3

Injection Molding Formulations.

| Formulation | 21 | 22 | 23 | 24 |
|---|---|---|---|---|
| PHA Blend #1 | 73 | 68 | 63 | 53 |
| Nucleating Agent Masterbatch | 5 | 5 | 5 | 5 |
| Talc | 11 | 11 | 11 | 11 |
| Calcium Carbonate | 10 | 10 | 10 | 10 |
| VINNAPAS ® B60 | 0 | 5 | 10 | 20 |
| ACRAWAX ® C Concentrate | 1 | 1 | 1 | 1 |

The nucleating agent was cyanuric acid dispersed at a rate of 33% (by weight) in CITROFLEX® A4 plasticizer (CP Hall) and milled in the plasticizer. The calcium carbonate was MULTIFLEX-MM® (Specialty Minerals); the talc was FLEXTALC® 610D (Specialty Minerals); the ACRAWAX® C (Lonza) concentrate was ACRAWAX® C pelletized 1:1 in a PHA blend composed of about 38-42% homo-polymer of 3-hydroxybutyrate, and about 58-62% co-polymer of 3-hydroxybutyrate and 4-hydroxybutyrate, where the 4-hydroxybutyrate was approximately 10-12%.

Example 4

PHA/PVAc Blends with Reactive Coupling

In this example, blends of high modulus PHA with PVAc were prepared in the presence of a peroxide agent (TRIGANOX® 131, Akzo Nobel). The overall effect of the peroxide was to facilitate the reactive coupling of the PHA and the PVAc polymers enhancing the toughness of the blend. The table below shows the results of the PVA grafting on tensile modulus, elongation, strength as well as notched Izod impact toughness and tear strength.

TABLE 4

Effect of Peroxide Grafting on Mechanical Properties of PHA/PVAc Blends.

| Formulation | 25 | 26 | 27 | 28 | 29 | 30 |
|---|---|---|---|---|---|---|
| PHA Blend #1 | 92 | 82 | 82 | 0 | 0 | 0 |
| PHA Blend #2 | 0 | 0 | 0 | 92 | 82 | 82 |
| VINNEX ® UW10FS | 0 | 10 | 10 | 0 | 0 | 0 |
| VINNEX ® LL2510 | 0 | 0 | 0 | 0 | 10 | 10 |
| Nucleant Masterbatch | 3 | 3 | 3 | 3 | 3 | 3 |
| CITROFLEX ® A4 | 5 | 5 | 4.8 | 5 | 5 | 4.8 |
| TRIGONOX ® 131 | 0 | 0 | 0.2 | 0 | 0 | 0.2 |
| Tensile Modulus (MPA) | 1108 | 1116 | 1241 | 460 | 473 | 494 |
| Tensile Strength at Break (MPA) | 18.4 | 21.1 | 23.2 | 18.2 | 24.0 | 24.5 |
| Elongation at Break (%) | 23 | 211 | 257 | 285 | 517 | 557 |
| Notched Izod Impact (ft lb/in) | 0.4 | 0.6 | 0.8 | — | — | — |
| Tear Strength (g/mil) | — | — | — | 10 | 26 | 80 |

Formulations 25-27 reflected the performance properties of an unfilled high modulus injection molding grade formulation. The incorporation of VINNEX® UW1 OFS a polyvinyl acetate homopolymer with PHA Blend #1 provided improvement in ductility and toughness as seen by the higher elongation at break and notched Izod impact performance. The incorporation of a small amount of the organic peroxide TRIGANOX® 131, to provide free radical coupling during the compounding operation, showed a further improvement in the ductility and toughness of the PHA/PVAc blend.

Formulations 28-30 represented film compositions based on a more elastomeric PHA composition and the improvements in both elongation at break and tear properties from the incorporation of VINNEX® LL2510 a vinyl acetate-ethylene terpolymer were significant. Incorporation of peroxide as a reactive coupling agent showed even greater enhancement in elongation and toughness.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein is used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of forming a biodegradable polymeric composition, comprising combining:
   a) a biologically-produced polyhydroxyalkanoate polymer;
   b) a toughening composition that includes a vinyl acetate polymer, the vinyl acetate polymer having from 60 percent to 100 percent by weight of vinyl acetate monomer, the remainder of monomers being selected from at least one of the following:
      (i) up to about 14 weight percent ethylene;
      (ii) (meth)acrylic esters;
      (iii) vinyl esters having from 1 to 12 carbon atoms in the carboxylic acid radical, provided that the vinyl ester is not vinyl acetate;
      (iv) a carboxyl-group-containing monomer selected from the group consisting of acrylic acid, methacrylic acid, crotonic acid, itaconic acid, fumaric acid, maleic acid, and salts thereof;
      (v) glycidyl methacrylate, hydroxyethyl methacrylate, acrylamide and vinyl pyrrolidone; and
      (vi) vinyl alcohol;
   c) a nucleating agent; and
   d) a peroxide branching agent,
   thereby forming a biodegradable polymeric composition.

2. The method of claim 1, wherein the vinyl acetate polymer is a vinyl acetate homopolymer.

3. The method of claim 1, wherein the vinyl acetate polymer is a a vinyl acetate copolymer having from about 84 to about 99 percent by weight of vinyl acetate monomer and from about 1 to 16 percent by weight of ethylene and acrylate comonomers.

4. The method of claim 1, wherein the vinyl acetate polymer is a vinyl acetate copolymer having up to about 15 percent by weight of a polyvinyl alcohol, said polyvinyl alcohol having from about 60 to about 99.8 percent by weight degree of hydrolysis.

5. The method of claim 1, wherein the biologically-produced polyhydroxyalkanoate polymer is in the form of a fine particle size powder and the vinyl acetate polymer is in the form of an emulsion, and wherein combining is done in an aqueous process prior to thermally removing water.

6. The method of claim 1, wherein the biodegradable polymeric composition comprises from 50 parts by weight to 90 parts by weight of the biologically-produced polyhydroxyalkanoate polymer, and from 10 parts by weight to 50 parts by weight of the toughening composition.

7. The method of claim 1, wherein the biologically-produced polyhydroxyalkanoate polymer is a poly(3-hydroxybutyrate) homopolymer, a poly(3-hydroxybutyrate-co-4-hydroxybutyrate), a poly(3-hydroxybutyrate-co-3-hydroxyvalerate), a poly(3-hydroxybutyrate-co-5-hydroxyvalerate), or a poly(3-hydroxybutyrate-co-3-hydroxyhexanoate).

8. The method of claim 1, wherein the biologically-produced polyhydroxyalkanoate polymer is a poly(3-hydroxybutyrate) homopolymer, a poly(3-hydroxybutyrate-co-4-hydroxybutyrate) with 5% to 15% 4-hydroxybutyrate content, a poly(3-hydroxybutyrate-co-3-hydroxyvalerate) with 5% to 22% 3-hydroxyvalerate content, a poly(3-hydroxybutyrate-co-5-hydroxyvalerate) with 5% to 15% 5-hydroxyvalerate content, or a poly(3-hydroxybutyrate-co-3-hydroxyhexanoate) with 3% to 15% 3-hydroxyhexanoate content.

9. The method of claim 1, wherein the biologically-produced polyhydroxyalkanoate is a) a poly(3-hydroxybutyrate) homopolymer blended with b) a poly(3-hydroxybutyrate-co-4-hydroxybutyrate); a) a poly(3-hydroxybutyrate) homopolymer blended with b) a poly(3-hydroxybutyrate-co-3-hydroxyvalerate); a) a poly(3-hydroxybutyrate) homopolymer blended with b) a poly(3-hydroxybutyrate-co-3-hydroxyhexanoate); a) a poly(3-hydroxybutyrate-co-4-hydroxybutyrate) blended with b) a poly(3-hydroxybutyrate-co-3-hydroxyvalerate); a) a poly(3-hydroxybutyrate-co-4-hydroxybutyrate) blended with b) a poly(3-hydroxybutyrate-co-3-hydroxyhexanoate) or a) a poly(3-hydroxybutyrate-co-3-hydroxyvalerate) blended with b) a poly(3-hydroxybutyrate-co-3-hydroxyhexanoate).

10. The method of claim 1, wherein the biologically-produced polyhydroxyalkanoate is a) a poly(3-hydroxybutyrate) homopolymer blended with b) a poly(3-hydroxybutyrate-co-4-hydroxybutyrate) with a 5% to 15% 4-hydroxybutyrate content; a) a poly(3-hydroxybutyrate) homopolymer blended with b) a poly(3-hydroxybutyrate-co-3-hydroxyvalerate) with a 5% to 22% 3-hydroxyvalerate content; a) a poly(3-hydroxybutyrate) homopolymer blended with b) a poly(3-hydroxybutyrate-co-3-hydroxyhexanoate) with a 3% to 15% 3-hydroxyhexanoate content; a) a poly(3-hydroxybutyrate-co-4-hydroxybutyrate) with a 5% to 15% 4-hydroxybutyrate content blended with b) a poly(3-hydroxybutyrate-co-3-hydroxyvalerate) with a 5% to 22% 3-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) with a 3% to 15% 3-hydroxyhexanoate content or a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) with a 3% to 15% 3-hydroxyhexanoate content.

11. The method of claim 1, wherein the biologically-produced polyhydroxyalkanoate is a) a poly(3-hydroxybutyrate) homopolymer blended with b) a poly(3-hydroxybutyrate-co-4-hydroxybutyrate) and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) and the weight of polymer a) is 5% to 95% of the combined weight of polymer a) and polymer b); a) a poly(3-hydroxybutyrate)

homopolymer blended to with b) a poly(3-hydroxybutyrate-co-3-hydroxyhexanoate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyvalerate) and the weight of polymer a) is 5% to 95% of the combined weight of polymer a) and polymer b); a) a poly(3-hydroxybutyrate-co-4-hydroxybutyrate) blended with b) a poly(3-hydroxybutyrate-co-3-hydroxyhexanoate) and the weight of polymer a) is 5% to 95% of the combined weight of polymer a) and polymer b); or a) a poly(3-hydroxybutyrate-co-3-hydroxyvalerate) blended with b) a poly(3-hydroxybutyrate-co-3-hydroxyhexanoate) and the weight of polymer a) is 5% to 95% of the combined weight of polymer a) and polymer b).

12. The method of claim 11, wherein the weight of polymer a) is 20% to 60% of the combined weight of polymer a) and polymer b) and the weight of polymer b) is 40% to 80% of the combined weight of polymer a) and polymer b).

13. The method of claim 1, wherein the biologically-produced polyhydroxyalkanoate is a) poly(3-hydroxybutyrate) homopolymer blended with b) a poly(3-hydroxybutyrate-co-4-hydroxybutyrate) with a 20-50% 4-hydroxybutyrate content; a) a poly(3-hydroxybutyrate) homopolymer blended with b) a poly(3-hydroxybutyrate-co-5-hydroxyvalerate) with a 20% to 50% 5-hydroxyvalerate content; a) a poly(3-hydroxybutyrate) homopolymer blended with b) a poly(3-hydroxybutyrate-co-3-hydroxyhexanoate) having a 5%-50% 3-hydroxyhexanoate content; a) poly(3-hydroxybutyrate-co-4-hydroxybutyrate) with a 5% to 15% 4-hydroxybutyrate content blended with b) a poly(3-hydroxybutyrate-co-4-hydroxybutyrate) with a 20-50% 4-hydroxybutyrate content; a) poly(3-hydroxybutyrate-co-4-hydroxybutyrate) with a 5% to 15% 4-hydroxybutyrate content blended with b) a poly(3-hydroxybutyrate-co-5-hydroxyvalerate) with a 20% to 50% 5-hydroxyvalerate content; a) a poly(3-hydroxybutyrate-co-4-hydroxybutyrate) with 5% to 15% 4-hydroxybutyrate content blended with b) a poly(3-hydroxybutyrate-co-3-hydroxyhexanoate) having a 5%-50% 3-hydroxyhexanoate content; a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content; a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate content; a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content; a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content; a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate; or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content.

14. The method of claim 1, wherein the biologically-produced polyhydroxyalkanoate is a) a poly(3-hydroxybutyrate) homopolymer blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyvalerate) with a 20% to 50% 5-hydroxyvalerate content and the weight of polymer a) is 5% to 95% of the combined weight of polymer a) and polymer b); a) a poly(3-hydroxybutyrate) homopolymer blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-4-hydroxybutyrate) with a 5% to 15% 4-hydroxybutyrate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); a) a poly(3-hydroxybutyrate-co-3-hydroxyvalerate) with a 5% to 22% 3-hydroxyvalerate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-4-hydroxybutyrate) with a 20-50% 4-hydroxybutyrate content and the weight of polymer a) is 5% to 95% of the combined weight of polymer a) and polymer b); a) a poly(3-hydroxybutyrate-co-3-hydroxyhexanoate) with a 3% to 15% 3-hydroxyhexanoate content blended with b) a poly(3-hydroxybutyrate-co-5-hydroxyvalerate) with a 20% to 50% 5-hydroxyvalerate and the weight of polymer a) is 5% to 95% of the combined weight of polymer a) and polymer b); or a) a poly(3-hydroxybutyrate-co-3-hydroxyhexanoate) with a 3% to 15% 3-hydroxyhexanoate content blended with b) a poly(3-hydroxybutyrate-co-3-hydroxyhexanoate) having a 5%-50% 3-hydroxyhexanoate content and the weight of polymer a) is 5% to 95% of the combined weight of polymer a) and polymer b).

15. The method of claim 14, wherein the weight of polymer a) is 20% to 60% of the combined weight of polymer a) and polymer b) and the weight of polymer b) is 40% to 80% of the combined weight of polymer a) and polymer b).

16. The method of claim 1, wherein the biologically-produced polyhydroxyalkanoate is further blended with polymer c) a poly(3-hydroxybutyrate-co-4-hydroxybutyrate) with a 20% to 50% 4-hydroxybutyrate content; c) a poly(3-hydroxybutyrate-co-5-hydroxyvalerate) with a 20% to 50% 5-hydroxyvalerate content, or c) a poly(3-hydroxybutyrate-co-3-hydroxyhexanoate) with a 5% to 50% 3-hydroxyhexanoate content.

* * * * *